United States Patent [19]

Trayner

[11] Patent Number: 4,877,201
[45] Date of Patent: Oct. 31, 1989

[54] BALLISTIC PROJECTILES

[75] Inventor: Brian T. Trayner, Stevenage, United Kingdom

[73] Assignee: British Aerospace Public Limited Company, London, England

[21] Appl. No.: 201,324

[22] Filed: May 31, 1988

Related U.S. Application Data

[63] Continuation of Ser. No. 80,234, Jul. 28, 1987, abandoned, which is a continuation of Ser. No. 883,725, Jul. 9, 1986, abandoned.

[30] Foreign Application Priority Data

Jul. 10, 1985 [GB] United Kingdom ................. 8517464

[51] Int. Cl.$^4$ .............................................. F42B 15/02
[52] U.S. Cl. .................................................... 244/3.21
[58] Field of Search .............................. 244/3.15, 3.21

[56] References Cited

U.S. PATENT DOCUMENTS

| | | | |
|---|---|---|---|
| 3,158,339 | 11/1964 | Woodbury et al. | 244/3.15 |
| 3,277,840 | 10/1966 | Li | 33/365 |
| 3,647,162 | 3/1972 | Muller | 244/3.15 |
| 4,054,254 | 10/1977 | Cole | 244/3.21 |
| 4,328,938 | 5/1982 | Reisman et al. | 244/3.21 |
| 4,346,363 | 8/1982 | Wilhelmson | 33/366 X |
| 4,462,254 | 7/1984 | Rider | 73/178 R |
| 4,467,639 | 8/1984 | Bush | 73/167 X |
| 4,608,641 | 8/1986 | Snell | 73/178 X |

Primary Examiner—Charles T. Jordan
Attorney, Agent, or Firm—Cushman, Darby & Cushman

[57] ABSTRACT

A method and apparatus for determining a vertical component of a spinning ballistic projectile. Signals are obtained corresponding to the acceleration along a sensitive axis, that is parallel but spaced from an axis of the spin. These signals include periodic and non-periodic terms. The periodic term is related to the spin frequency. Therefore, these signals are processed to isolate the periodic term. By ascertaining the phase of this signal with reference to a reference point, an indication of the vertical plane can be obtained.

11 Claims, 3 Drawing Sheets

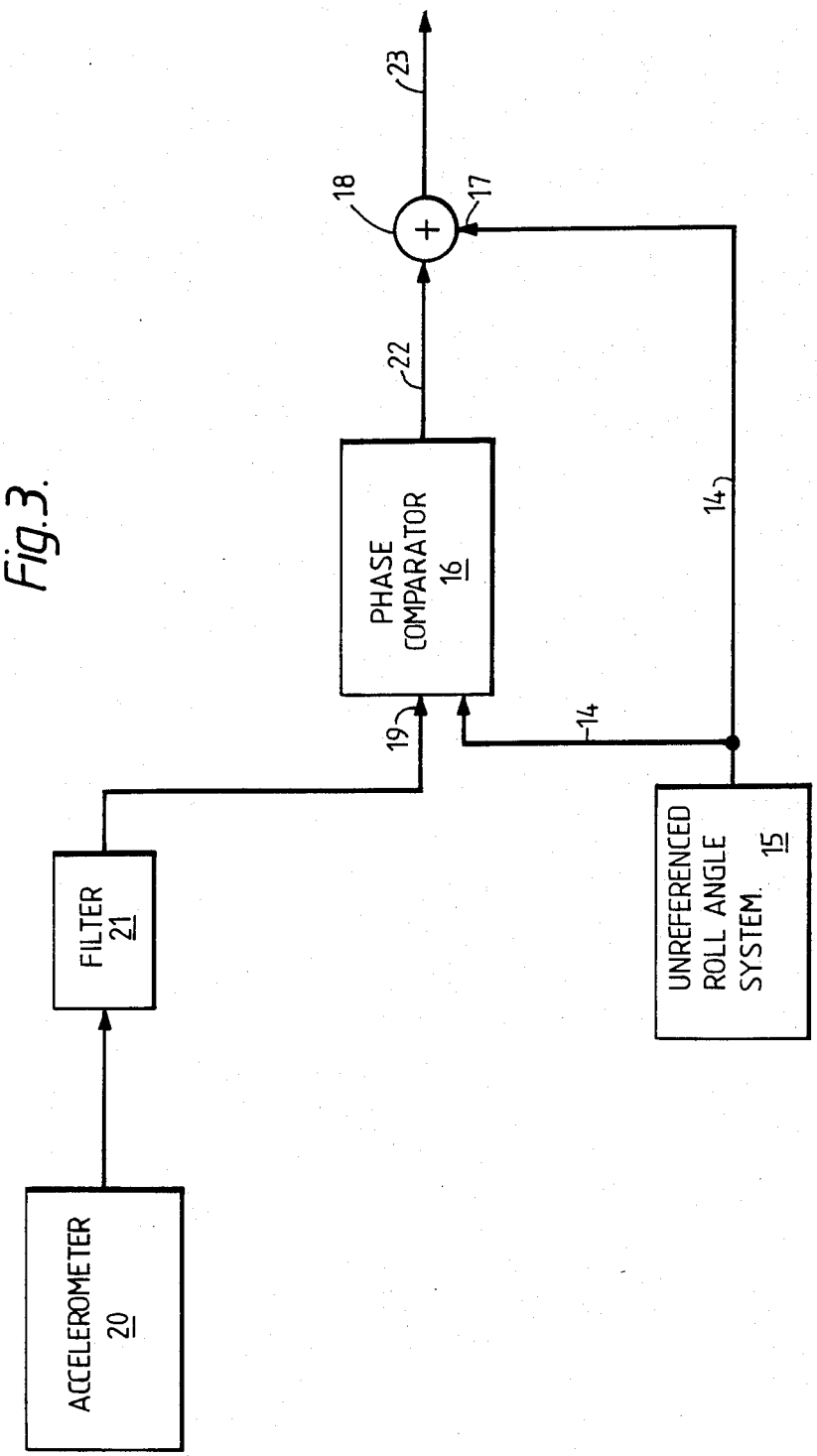

BALLISTIC PROJECTILES

This is a continuation of application Ser. No. 080,234 filed July 28, 1987 which was abandoned upon the filing hereof, which was a continuation of Ser. No. 883,725 filed July 9, 1986, now abandoned.

BACKGROUND AND SUMMARY OF THE INVENTION

This invention relates to method and means for determining the vertical plane incluing the axis of spin of spinning ballistic projectiles, in appreciation of the problem that in conditions of zero gravity conventional means for determining the vertical, such as pendulum devices, are not effective.

During ballistic flight, a projectile tilts about a horizontal pitch axis which is perpendicular to its direction of flight. The projectile executes the first part of its trajectory tilted in a nose-up attitude or attitudes, and subsequently, in the latter part of the trajectory in a nose-down attitude or attitudes. The projectile thus rotates about the horizontal pitch axis. In order to cause the projectile to depart fom its ballistic trajectory, for example to execute a 'pull up' maneuver, the projectile must be tilted about this axis to alter its angle of incidence, that is to asy its pitch axis is tilted with respect to its trajectory or line of flight.

Naturally, this change of angle of incidence or tilting movement must be effected whether the projectile is spinning or is de-spun so that the projectile is properly controlled.

It is therefore an object of the invention to provide method and means to indicate the vertical plane through the projectile axis and also the projectile's position with respect to that plane at any stage in flight.

According to one aspect of the invention, there is provided a method of determining the position of the vertical plane extending through the spin axis of a spinning ballistic projectile in flight, the method comprising the steps of:

obtaining signals corresponding to the acceleration experienced along a sensitive axis parallel to but spaced from the spin axis, said signals containing periodic and non-periodic terms, the periodic term being related to the spin frequency, processing said signals to isolate the periodic term, and ascertaining the phase of said signal with reference to a datum so that an indication of the vertical plane is obtained.

According to a further aspect of the invention, a projectile which spins in ballistic flight and which requires the position of the vertical plane extending through the spin axis to be determined includes accelerometer means mounted with its sensitive axis parallel to but spaced from the spin axis to provide output signals indicative of the acceleration experienced along said sensitive axis, said signals containing periodic and non-periodic terms, the periodic term being related to the spin frequency, and processing means for isolating the periodic term and ascertaining the phase thereof so that an indication of the vertical plane is obtained.

BRIEF DESCRIPTION OF THE DRAWINGS

For a better understanding of the invention, reference will now be made, by way of example, to the accompanying drawings in which:

FIG. 3 shows a block diagram of another circuit which can be used to provide the desired output where there is an unreferenced roll angle system.

FIG. 1 shows a projectile body 1 having a spin axis X—X extending through its center ie on its longitudinal axis. In the body 1 is mounted an accelerometer 2, which is positioned on an axis Y—Y space at a distance r from the spin axis X—X and parallel to it, the sensitive axis of the accelerometer 2 being aligned with the axis Y—Y.

During ballistic flight, the projectile body tilts about a horizontal pitch axis Z—Z which is perpendicular to its direction of flight (shown by arrow 'A'). The projectile executes the first part of its trajectory tilted in a nose-up attitude or attitudes, and subsequently, in the latter part of the trajectory in a nose-down attitude or attitudes. The projectile body thus rotates about the axis Z—Z. Movement about an axis perpendicular to both X—X and Z—Z is small and is usually ignored. In order to cause the projectile to depart from its ballistic trajectory, for example to execute a 'pull up' maneouvre, the projectile must be tilted about the Z—Z axis to alter its angle of incidence, that is to say its axis X—X is tilted with respect to its trajectory or line of flight.

Naturally, this change of angle of incidence or tilting movement must be effected whether the projectile is spinning or is de-spun so that the projectile is properly controlled. Therefore, method and means must be provided to indicate the vertical plane through the projectile axis and also the projectile's position with respect to that plane at any stage in flight. The rotation rate $\Omega$ about the pitch axis Z—Z can be easily ascertained from the trajectory of the projectile. The acceleration z experienced by the accelerometer can be shown to contain a non-periodic and a periodic term and can be given as:

$$z = \frac{dv}{dt} + 2rw\Omega \cos wt \qquad (1)$$

where v=forward velocity of the projectile at that instant, and w=spin frequency of the projectile about its spin axis X—X. When the projectile is in a ballistic trajectory, the rotation rate is given by $$\Omega = \frac{g\cos\theta}{v}$$

where g is the acceleration due to gravity and $\theta$ is the angle of the trajectory to the horizontal. Therefore equation (1) becomes $$z = \frac{dv}{dt} + \frac{2rwg\cos\theta}{v} \cos wt \qquad (2)$$

the zero points of the second term ie the periodic term occur when the accelerometer 2 passes through the vertical plane which contains the roll axis X—X of the projectile. Therefore, an indication of the vertical plane can be obtained by measuring the phase of the periodic term and making allowance for the phase response of the accelerometer 2.

Figure 1:
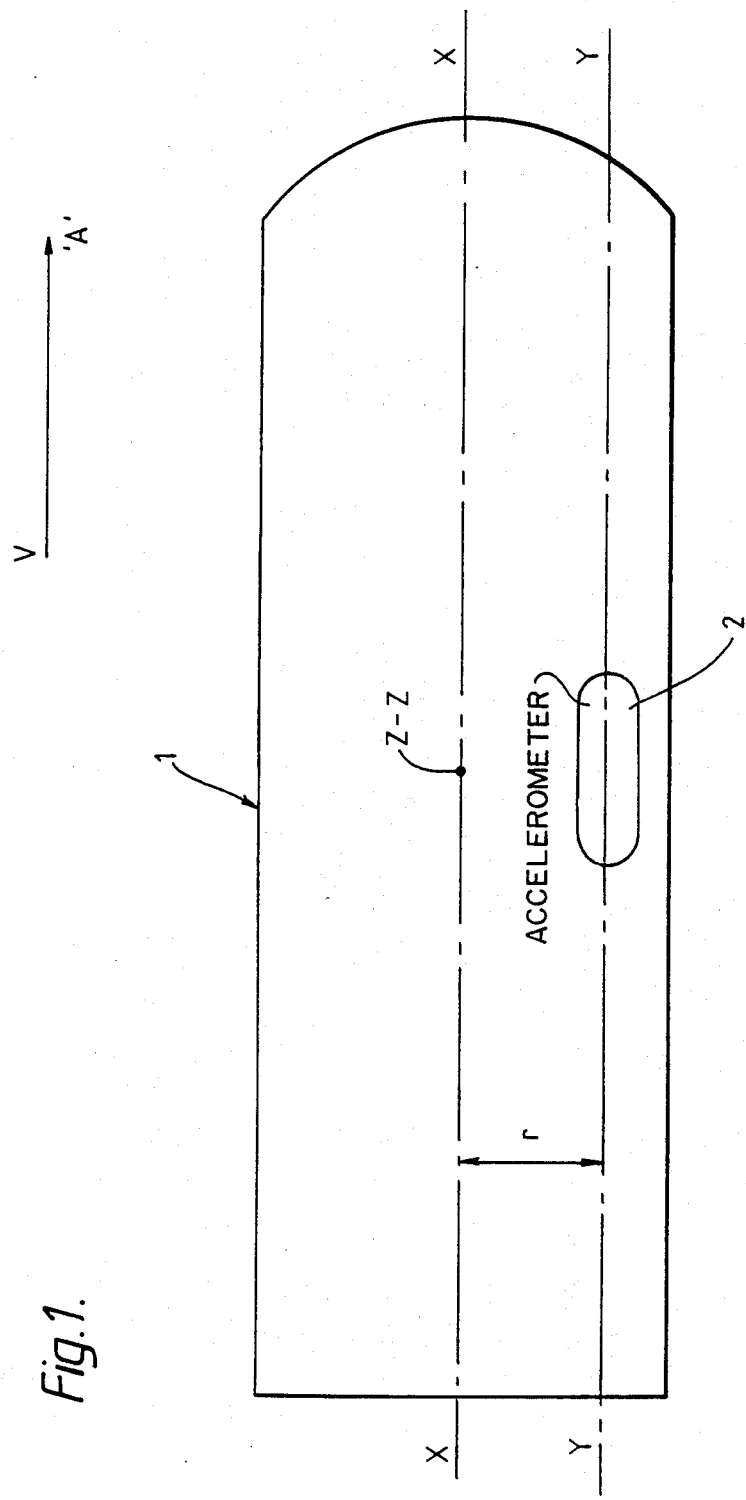
FIG. 1 is a sketch of a projectile showing the position in which an accelerometer may be mounted.
Figure 2:
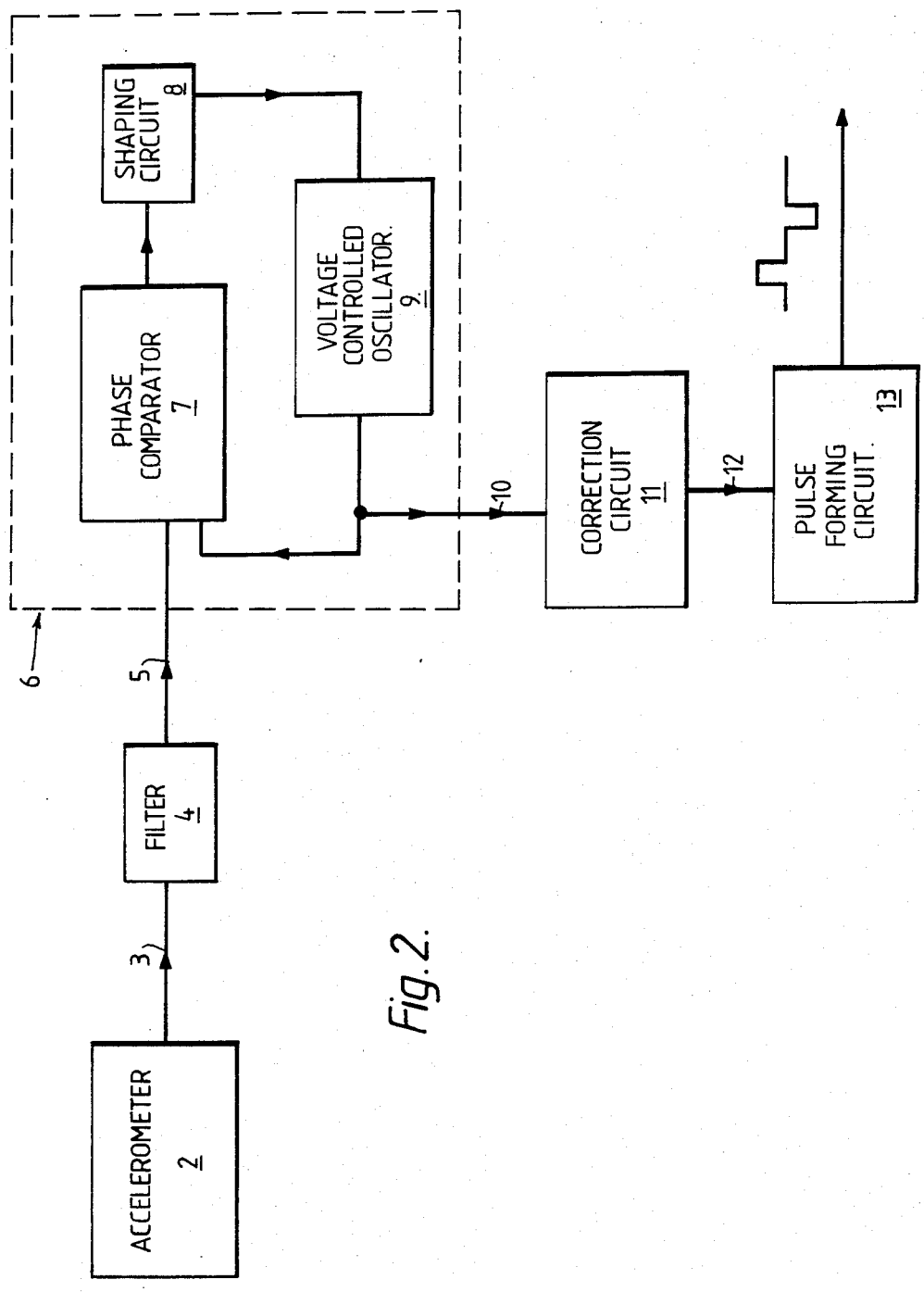
FIG. 2 is a block diagram of a circuit which is used to obtain an indication of the vertical plane from the accelerometer signals.

FIG. 2 shows a circuit which can be used to provide the desired output ie an indication of the vertical plane through the roll axis X—X. The accelerometer 2 passes or transmits a signal 3 to a filter 4 where the signal is filtered to remove the non-periodic term ie the dv/dt term, and any high frequency noise that might be present in the signal 3. The filtered signal 5 is then passed to a phase-locked loop 6 which comprises a phase comparator 7, a shaping circuit 8 and a voltage-controlled oscillator 9. The phase-locked loop 6 provides a comparatively noise-free signal 10 which is in the phase with the periodic term of the accelerometer output. The signal 10 is then passed to a correction circuit 11, the circuit correcting for any phase lags which may have been introduced by the accelerometer 2 and filter 4. The output signal 12 is fed to a pulse-forming circuit 13 which amplifies, limits and differentiates the signal 12 to provide alternate positive and negative pulses corresponding to the accelerometer 2 passing through the vertical plane containing the roll axis X—X of the projectile.

The pulse forming circuit 13 is a convenient way of relating the electrical phase of the signal ie as the accelerometer passes through the vertical plane through the spin axis X—X with the mechanical phase of the projectile rotation.

The output pulses can be used in two ways:

(i) to provide a separate roll reference to the vertical plane before the projectile is either de-spun or is subjected to control signals which cause it to depart from ballistic flight, or (ii) to act as a vertical or roll reference whilst the projectile is in a ballistic flight.

If an unreferenced roll angle system is used, for example a two axis position gyroscope uncaged at an arbitrary roll angle, the circuit shown in FIG. 3 can be utilised to provide the desired output signal. If the output of such a system is periodic at the roll frequency, output signals 14 from the unreferenced roll angle system 15 are passed to a phase comparator 16 and also forms an input 17 to a mixter 18. The output 14 from the system 15 is compared with signals 19 received from an accelerometer 20 via a filter 21 in the comparator 16. Output signals 22 from the comparator 16 are then added with the input 17 in the mixier 18 to provide output signals 23.

The output signals 22 from the comparator 16 represent an angle which when added to the signal 17 provides the output signal 23 ie a roll angle signal referenced to the vertical.

The two axis position gyroscope described as an unreferenced roll angle system may be replaced by a roll rate gyroscope and integrator.

I claim:

1. A method of determining a position of a vertical plane extending through a spin axis of a spinning ballistic projectile in flight, the method comprising the steps of:
   obtaining signals corresponding to an acceleration experienced along a sensitive axis parallel to but spaced from the spin axis, said signals containing periodic and non-periodic terms, the periodic term being related to the spin frequency,
   processing said signals to isolate the periodic term, and
   ascertaining the phase of said signal with reference to a reference phase so that an indication of the vertical plane is obtained.

2. A method according to claim 1, wherein said reference phase is derived from said periodic term.

3. A method according to claim 2, wherein said signals are compared with said reference phase and any differences in phase is corrected to form corrected signals.

4. A method according to claim 3, wherein said corrected signals are used to form a series of alternate positive and negative pulses indicative of the vertical plane through the spin axis.

5. A vertical plane deviation detector for a projectile which spins in ballistic flight and which requires the position of the vertical plane extending through the spin axis to be determined comprising
   accelerometer means mounted with its sensitive axis parallel to but spaced from the spin axis to provide output signals indicative of the acceleration experienced along said sensitive axis, said signals containing periodic and non-periodic terms, the periodic term being related to the spin frequency, and
   processing means for isolating the periodic term and ascertaining the phase thereof so that an indication of the vertical plane is obtained.

6. A vertical plane deviation detector for a projectile which spins in ballistic flight and which requires the position of the vertical plane extending through the spin axis to be determined comprising:
   accelerometer means mounted with its sensitive axis parallel to but spaced from the spin axis to provide output signals indicative of the acceleration experienced along said sensitive axis, said signals containing periodic and non-periodic terms, the periodic term being related to the spin frequency, and
   processing means for isolating the periodic term and ascertaining the phase thereof so that an indication of the vertical plane is obtained, wherein the processing means includes filter means for removing the non-periodic term from the output signals.

7. A projectile according to claim 6, wherein the processing means includes comparator means for comparing the phase of the output signals with the phase of the periodic term, the comparator means forming part of a phase-locked loop.

8. A projectile according to claim 7, wherein the processing means includes correction means for correcting the output signals for any difference in phase from the periodic term.

9. A projectile according to claim 8, wherein the processing means includes pulse forming means for forming alternate positive and negative pulses corresponding to the accelerometer means passing through the vertical plane containing the spin axis.

10. A projectile according to claim 9, wherein the pulse forming means comprises amplifier means, limiting means and differentiating means.

11. A method of determining a position of a vertical plane extending through a spin axis of a spinning ballistic projectile in flight, the method comprising the steps of:
    obtaining signals corresponding to an acceleration along a sensitive axis parallel to but spaced from the spin axis, said signals containing periodic and non-periodic terms, the periodic term being related to the spin frequency,
    filtering said signals using a filter means to remove the non-periodic term to isolate the periodic term, and
    ascertaining the phase of said signal with reference to a reference phase so that an indication of the vertical plane is obtained.

* * * * *